United States Patent [19]
Carney

[11] Patent Number: 5,611,739
[45] Date of Patent: Mar. 18, 1997

[54] GOLF CLUB PUTTER WITH LASER AIMING SYSTEM

[76] Inventor: William P. Carney, 4 High Ridge La., Oyster Bay, N.Y. 11771

[21] Appl. No.: 543,442

[22] Filed: Oct. 16, 1995

[51] Int. Cl.$^6$ ................................................ A63B 69/36
[52] U.S. Cl. ........................................................ 473/220
[58] Field of Search ............................................. 473/220

[56] References Cited

U.S. PATENT DOCUMENTS

| | | | |
|---|---|---|---|
| 5,207,429 | 5/1993 | Walmsley et al. | 473/220 |
| 5,213,331 | 5/1993 | Avanzini | 473/220 |
| 5,350,188 | 7/1994 | Reimers | 273/186.3 |
| 5,388,832 | 2/1995 | Hsu | 273/186.3 |

*Primary Examiner*—George J. Marlo
*Attorney, Agent, or Firm*—Charles E. Temko

[57] ABSTRACT

A laser aiming apparatus for a golf club putter is disclosed. The putter includes a head having a transversely extending generally planar front face and a generally planar rear portion formed substantially parallel to the front face and spaced apart therefrom. An electrically conductive laser housing having a laser module mounted therein is removably affixed to the head. The head is clamped between an alignment surface formed in the housing which engages the front face and a clamping element affixed to the housing which provides biased contact against the rear portion such that a laser beam emitted by the laser module is aimed in a horizontal direction substantially perpendicular to the front face. A player employs the laser beam to properly align the club face during putting practice. The apparatus includes a conductive switch element in sliding biased contact with the conductive housing for closing an electrical circuit which powers the laser module.

12 Claims, 5 Drawing Sheets

GOLF CLUB PUTTER WITH LASER AIMING SYSTEM

BACKGROUND OF THE INVENTION

1. Field of the Invention

This invention relates to golf clubs and more particularly to a novel arrangement for mounting a laser aiming system on a putter.

2. Description of Related Art

Golf club laser aiming systems which provide golf club putters with laser aiming beams are well known in the art. Such systems are used by golfers as training aids when practicing putting. It is generally accepted that a golfer achieves optimum putting practice on an actual putting green using the same putter as will be used on the course. Both private and public golf courses typically have practice greens so that a golfer may practice with his or her putter before going out to play a round of golf. Practice greens are maintained to replicate the greens on the course and thereby provide a player the opportunity to practice putting speed and putting direction under actual playing conditions.

Putting speed is partially a function of the condition of the green and partially a function of the head weight and feel of the putter. Putting direction is a function of the golfer's perception of proper club alignment, that is, how he or she aims the putter at the hole. Typically, a putter is properly aimed and aligned for a straight putt when the face of the putter is centered behind the ball and is perpendicular to the desired line or path of the ball.

On the practice green, a golfer gets a sense of the speed of the green by noting the speed of his or her actual putt. Similarly, a golfer develops a sense of proper club alignment by aiming his or her putter at a practice green pin located in the center of a practice green hole and after aiming the club and striking the ball, noting the actual direction of his or her putt.

As was previously indicated, it is desirable for golfers to practice with the same putter they routinely use on the golf course. Thus, there is a need for a device which can be removably affixed to the head of a golfer's putter which provides the user an aiming beam by which to determine if he or she is actually aligning the club face so that it is perpendicular to the desired path of the ball. Typical devices which relate to the present invention include laser aiming beam modules that attach, by various means, to the head of a golfer's putter. It is desirable that the attachment means removably affix the aiming device to the putter in such a way so as to ensure the perpendicularity of the aiming beam to the club face without the need for adjustably aligning the beam with an aligning procedure each time the device is attached to the club head. It is also desirable that the attachment mechanism provide the user a means by which to securely locate the aiming beam over a selected point on the putter head at which he or she normally impacts the ball. Further, it is desirable that the attachment means securely clamp the aiming device to the head and not require any modification to the putter such as threaded holes formed in the putter for use in attaching the laser aiming device to the putter.

The following United States Patents show prior art aiming systems to which the present invention is applicable:

U.S. Pat. No. 5,165,691, which issued on Nov. 24, 1992 to Jon C. Cook, discloses a golf club laser aiming system which comprises one or two laser generators mounted on the club head with the associated power source mounted in the club handle. It does not specifically address the problem of removably affixing a laser module to the head of a putter in such a way as to securely clamp the device to the head of the putter while ensuring the perpendicularity of the aiming beam to the club face in such a way that the user may locate the aiming beam over a selected point on the putter head at which the user desires to impact the ball. In addition, the two parallel light beams, as disclosed, cannot be conveniently used to practice club alignment on a practice green having cups fitted with individual hole marking pins.

U.S. Pat. No. 5,169,150, which issued on Dec. 8, 1992 to John C. Tindale, discloses a laser beam generator attached to a club head which emits a laser beam at the point on the face of the head where the ball is struck by the club face. The laser beam, as described in the disclosure, is aimed at a target having a graduated measuring scale so that the user of the club may calibrate a sighting line on the putter to compensate his or her inherently misaligned putting stroke. Tindale's disclosure does not provide a solution for removably affixing a laser aiming module to the head of a club so that the user can locate the aiming beam over a golf ball in position to be putted. In the arrangement disclosed, the laser beam cannot be aimed at a pin on a putting green with the golf ball in position to be putted because of the location of the laser emitter.

U.S. Pat. No. 5,193,812, which issued on Mar. 16, 1993 to Mark W. Hendricksen, discloses a laser aiming device that attaches to a club head by means of a mounting bracket which is removably affixed to the putter by screws which engage threaded holes formed in the heel portion of the putter head. Hendricksen's disclosure does not solve the problem of removably affixing the laser aiming device without the need of modification to the user's club.

U.S. Pat. No. 5,207,429, which issued on May 4, 1993 to Richard G. Walmsley and Keith R. Degenhardt discloses a laser aiming unit for attachment to a club shaft. The laser unit is removably affixed to the shaft by a mounting arrangement which grips the shaft and requires that the user align the aiming beam with some form of alignment procedure each time the unit is affixed to the shaft. This disclosure does not solve the problem of removably affixing the laser aiming device without having to align the aiming beam each time the unit is attached to the club to practice putting.

U.S. Pat. No. 5,213,331, which issued on Mar. 25, 1993 to Frank Avanzini, discloses a laser aiming device which attaches to a club head by means of an adjustable mounting bracket. The laser device and its associated bracket are adjustable in a vertical plane perpendicular to the ball striking surface of a putter so that the laser beam may be projected over the top of a golf ball onto a putting surface at select distances forwardly of the golf ball. Avanzini discloses a laser module mounting bracket which is removably attached to the head of the putter by an adhesive layer. Avanzini does not solve the problem of providing a means to removably affix and securely clamp the laser module to the head of the putter ensuring the perpendicularity of the laser aiming beam to the front face of the putter while the putter is being used to practice putting.

U.S. Pat. No. 5,330,188, which issued on Jul. 19, 1994 to Eric W. Reimers discloses a putter aiming system having a collimated light beam source mounted on the head of a golf club. The mounting arrangement taught by Riemers includes a hosel grip which fits over the hosel portion of the putter. For those putters which do not have a hosel portion, the hosel grip fits over a lower portion the shaft. A cantilever portion extends from the hosel grip to a light source bracket in which the light source is mounted. A blade brace extends downward from the light source bracket which prevents the mounting arrangement from rotating around the shaft. Alternatively, the blade brace and the bracket can be temporarily secured to the putter by a removable adhesive or, with some putters, a magnetic attachment. Riemers does not address the problems related to securely clamping the light source directly to only the head so as to removably affix the light source in an optimum position independent of the hosel and shaft location. Using removable adhesive or magnetic attachment means, as taught by Riemers, to eliminate the need for the hosel grip and catiliver bracket does not provide a means by which to securely clamp the light source to the head. In addition, because putters are subject to mechanical shock during putting practice, either magnetic or adhesive attachment means may not be rigid enough to ensure continued perpendicularity of the laser device to the front face of the putter during a practice session.

U.S. Pat. No. 5,388,832, which issued on Feb. 14, 1995 to Kuo H. Hsu, discloses a laser aiming device that attaches to a club head by means of a mounting bracket which is affixed to the putter head by a screw which engages a threaded hole in the heel portion of the putter head. Hsu's patent does not solve the problem of removably affixing the laser aiming device without the need of modification to the user's club.

As can be seen from the foregoing, there is a definite need for a golf club laser aiming device which can be removably affixed to the golfer's personal putter for putting practice in such a way as to ensure that the laser aiming beam is emitted in a direction perpendicular to the striking surface without the need for the user to employ a procedure to initially align the aiming beam each time the device is used. In addition, a device is needed which can be removably and securely affixed to the putter head so that the laser beam is projected in a substantially horizontal direction over the golf ball when the golf ball is impacted by the striking surface at a point on the club head where the user normally strikes the ball. Further, a laser aiming device is needed that can be securely affixed to the head by the user without the need to modify the user's putter and in such a way that the aiming device maintains its alignment during whatever shock and vibration it is exposed to while being used for putting practice.

In summary, a substantially shockproof laser aiming device is required that can be removably affixed to a putter for use on a putting green without the need for constant beam adjustment.

SUMMARY OF THE INVENTION

The present invention overcomes the above described disadvantages and provides a laser aiming apparatus which may be removably affixed to a golfer's personal putter. The aiming device securely clamps to the head of the putter and is employed by the golfer to properly align the face of the club head when practicing putting.

In a first aspect, the present invention comprises a putter including a shaft having a putter head affixed at a first end of the shaft and a grip affixed at a second end. The head has a transversely extending generally planar front face for striking a golf ball and a generally planar rear portion formed substantially parallel to the front face and spaced apart therefrom. Removably affixed to the putter head is a laser housing having an upper and a lower portion. The lower portion defines at least one mounting tab including a generally planar alignment surface adapted to engage the front face of the putter head. The upper portion includes a bore formed therein such that the axis of the bore is perpendicular to the alignment surface. A laser module mounted in the bore is adapted to project a laser beam through an opening in the bore such that the laser beam is coincident with the axis of the bore. At least one clamping means is affixed to the laser housing. The clamping means is positioned into biased contact with the rear portion of the head for removably affixing the laser housing to the head such that the head is clamped between the alignment surface and the clamping means so that the laser beam is emitted substantially perpendicular to the front face of the head. The golfer holds the putter by the grip and uses the laser beam to align the putter.

In a second aspect, the present invention comprises an electrically conductive laser housing affixed to a putter head. The putter head has a face on a front side thereof for striking a golf ball and the laser housing has a bore including an opening through a front side thereof. A laser module mounted in the bore is adapted to project a laser beam through the opening in the front side such that the laser beam is coincident with the axis of the bore. A voltage source and a conductive switch element for controlling the voltage source communicate in the bore. The laser module has first and second conductive means coupling opposite polarity potentials, a first pole and a second pole, from the voltage source to the laser module to cause the laser module to emit the laser beam. The second pole and the second conductive means are insulated from the conductive housing wherein the second pole and the second conductive means are electrically connected. The conductive switch element is in sliding biased contact with the conductive housing and, in an off position, is insulated from the first conductive means. The first pole of the voltage source is electrically connected to the conductive housing such that when the switch element is placed in an on position, the switch element electrically connects the first conductive means to the first pole through the conductive housing. The laser beam is employed by a user of the putter for controlling the direction of the golf ball.

In a third aspect, the present invention comprises a putter including a shaft having a putter head affixed at a first end of the shaft and a grip affixed at a second end. The head has a transversely extending generally planar front face for striking a golf ball and a rear side having a generally planar rear portion formed substantially parallel to the front face and spaced apart therefrom. Removably affixed to the putter head is a laser housing having an upper and a lower portion. The lower portion defines left and right mounting tabs having coplanar alignment surfaces adapted to engage the front face of the putter head to the left and to the right, respectively, of a select point on the front face where the front face impacts the ball. The upper portion includes a bore formed therein such that the axis of the bore is perpendicular to the coplanar surfaces of the mounting tabs. A laser module is mounted in the bore adapted to project a laser beam through an opening in the bore such that the laser beam is coincident with the axis of the bore. At least one clamping means is affixed to the laser housing. The clamping means is positioned into biased contact with the rear portion of the head for removably affixing the laser housing to the head such that the head is clamped between the alignment surfaces and the clamping means so that the laser beam is emitted substantially perpendicular to the front face of the head. The golfer holds the putter by the grip and uses the laser beam to align the putter and impacts the golf ball with the front face.

DETAILED DESCRIPTION OF THE INVENTION

Figure 1:
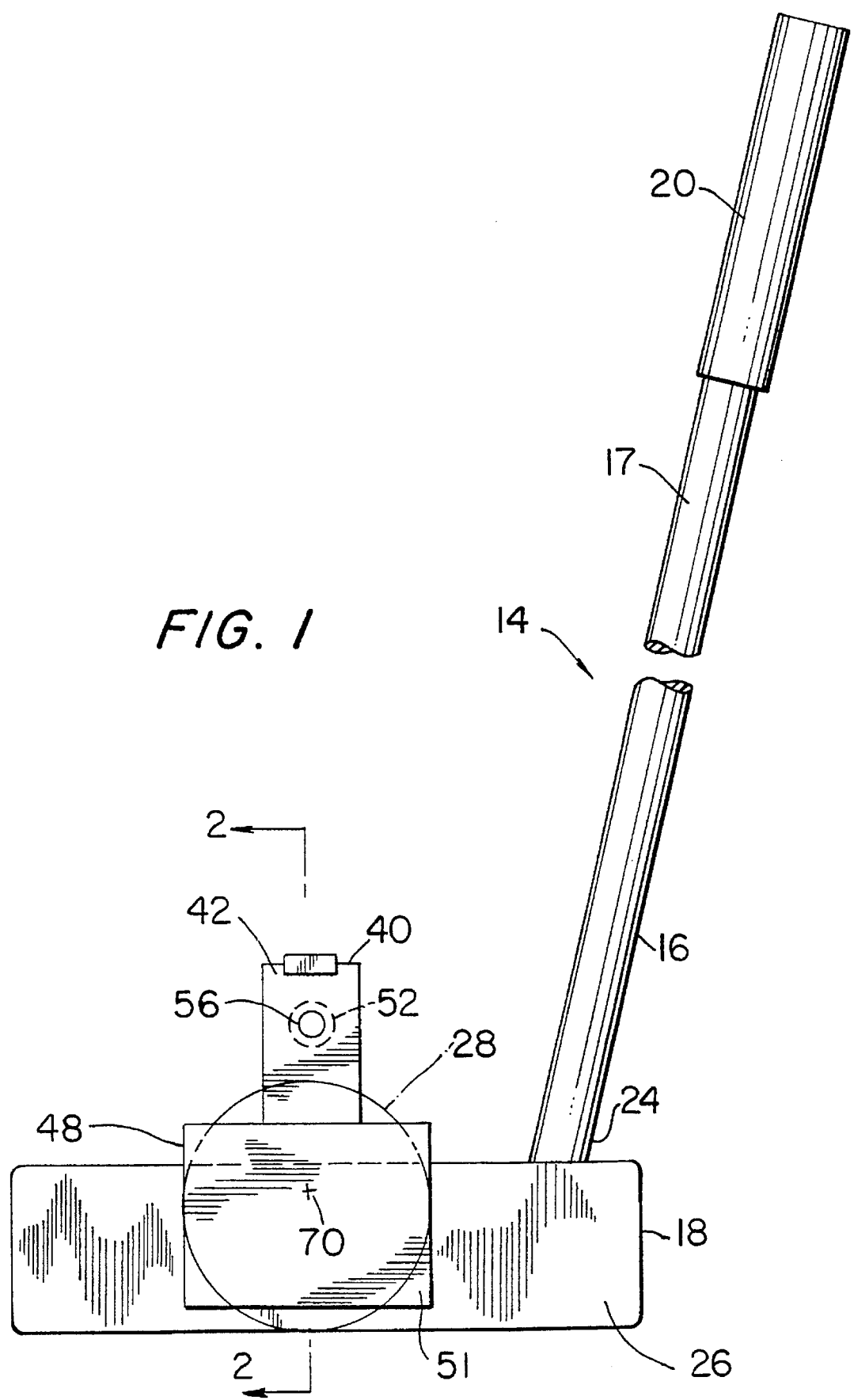
FIG. 1 is a front view of a golf club putter including a first embodiment of the laser aiming device of the present invention removably affixed to the head of the putter.
Figure 2:
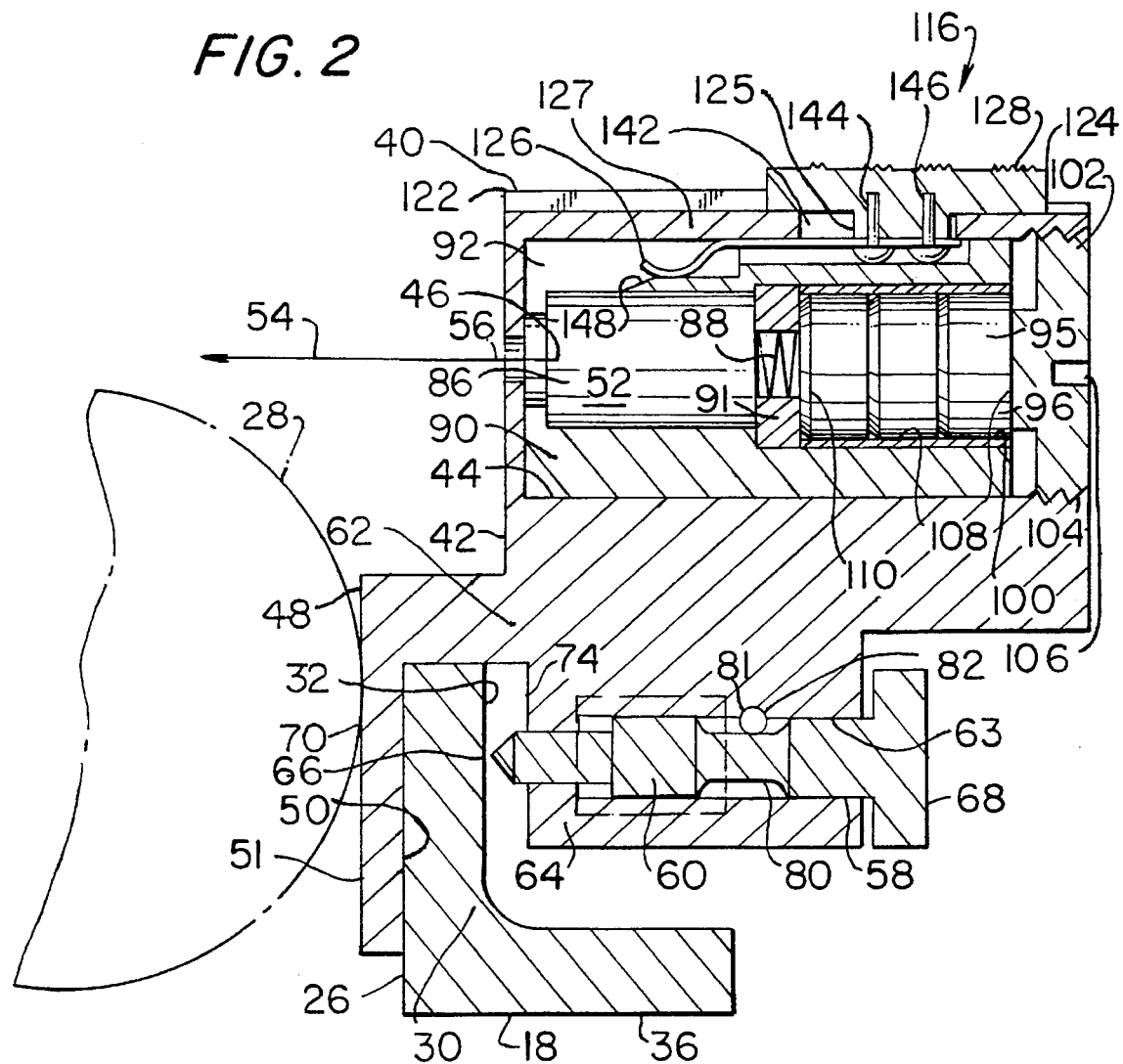
FIG. 2 is an enlarged sectional view of the laser aiming device shown in FIG. 1 taken along lines 2—2.

As illustrated in FIGS. 1 and 2, a putter generally referred to by reference number 14, comprises a shaft 16, a head 18 and a grip 20. The grip 20 fits over an upper end of the shaft 17 and is used by a player to hold and align the putter 14. The head 18 attaches to a lower end 24 of the shaft 16 and has a transversely extending generally planar front face 26 and a rear side 30 including a generally planar rear portion 32 formed substantially parallel to the front face 26 and spaced apart therefrom. A generally flat weighted heel portion 36 is formed as part of the head 18 normal to the generally vertical front face 26. Shown in phantom adjacent the front face 26 is a golf ball 28 in position to be putted.

A laser housing 40 having an upper portion 122 and a lower portion 62 is removably affixed to the head 18 of the putter 14. Included as part of the upper portion 122 is a generally planar front surface 42 and a bore 44 formed therein. Also, defined by the laser housing 40 is at least one tab 48 formed in the lower portion 62 below and adjacent the front surface 42 for engaging the front face 26 of the head 18. The tab 48 provides a planar alignment surface 50 which is perpendicular to the axis 46 and which contacts the front face 26 thereby aligning the axis 46 substantially perpendicular to the front face 26 of the head 18. On the front surface of the tab 48 there is a generally planar tab face 51 which is substantially parallel to the plane of the alignment surface 50 and which impacts the golf ball 28 when the laser housing 40 is affixed to the putter 14 for putting practice. A laser module 52 and associated voltage source 95 are mounted in the bore 44 and, as will be explained in detail below, it is turned on by the player to emit a laser aiming beam 54 coincident with the axis 46 of the bore 44. The beam 54 is emitted through an opening 56 in the front surface 42 and it is projected in a horizontal direction perpendicular to the front face 26.

A clamping screw 58 having a male threaded section 60 threadedly engages the lower portion 62 of the laser housing 40 in which there is a female threaded section 64. By rotating a knob 68 which is formed as part of the clamping screw 58, the player tightens a cone point 66 of the clamping screw 58 against the generally planar rear portion 32 of the head 18. The force of the cone point 66 against the rear portion 32 urges the alignment surface 50 against the front face 26 such that the housing 40 is securely clamped and aligned with respect to the head 18 thereby ensuring that the laser aiming beam 54 is emitted substantially perpendicular to the front face 26.

Unlike prior art devices, the mounting arrangement for the laser housing 40 disclosed herein is independent of the location of the lower end of the shaft 24 or the hosel and, thus, the housing 40 can be affixed to the head 18 in a position, as determined by the player, regardless of the location of the lower end of the shaft 24 or hosel. The mounting arrangement of the present invention provides the player a means by which to move the laser housing 40 in a transverse direction along the head 18 in order to clamp the laser housing 40, and thereby locate the laser aiming beam 54, at a location above the front face 26 where he or she prefers to impact the golf ball 28. Once the housing 40 is clamped in an optimum location and before stroking a practice putt, the player aligns the putter 14 so that the laser beam 54 is emitted over the golf ball 28 which is in a location adjacent the front face 26 tangent to a point 70 in position to be putted. The laser beam 54 is aimed at a selected target such as a pin in a hole thereby aligning the front face 26 perpendicular to the intended path of the ball 28.

Further, unlike prior art devices, the means by which the present invention removably affixes the laser housing 40 to the head 18 of the putter 14 does not depend on either a layer of adhesive such as a section of double sided tape or on an arrangement which uses magnets. Adhesive layers are easily contaminated in the dust and moisture laden environments in which putters are typically used and, once contaminated, will not provide a secure means by which to removably affix the laser aiming housing 40 to the putter 14. Also, double sided tape which is left on any surface of the putter 14 can harden and present a problem when the player tries to remove the tape after using it for putting practice.

In addition, the use of magnets as disclosed in the prior art, may result in alignment errors caused by impacts that occur during putting practice which can cause the laser aiming device to shift with respect to the head 18 upon which it is magnetically attached. It is important to note that the present invention provides an extremely reliable and secure means by which to removably affix the laser housing 40 to the head 18 of most standard putters.

The laser housing 40, as shown in FIG. 2, is preferably fabricated from a metalic material such as a hard aluminum alloy. Bores and surfaces defined by the housing 40 are machined to a high degree of accuracy by any one of a number of hole drilling and surface milling techniques which may be performed on a numerically controlled milling machine or other fabricating machinery known to those skilled in the art. The axis 46 of the bore 44 in which the laser module 52 is mounted is accurately drilled perpendicular to the alignment surface 50, the tab face 51 and the front surface 42. Since the axis 46 is perpendicular to the alignment surface 50 which is clamped firmly against the front face 26, the laser aiming beam 54 emitted by the laser module 52 is aimed in a substantially horizontal direction perpendicular to the front face 26 of the putter head 18 and perpendicular to the tab face 51.

As mentioned above and as shown in FIG. 2, there is formed in the lower portion 62 of the laser housing 40 a bore 63 having the female threaded section 64. The clamping screw 58, preferably manufactured from a metalic material such as a hard aluminum alloy, has fabricated thereon the male threaded section 60 for threadedly engaging the female threaded section 64. In addition, the clamping screw 58 includes the cone point 66, an undercut portion 80 and the knob 68. A retaining pin 82 is pressed into a transverse bore 81 formed in the lower portion 62 so as to engage the undercut 80 thereby preventing the clamping screw 58 from being inadvertently unscrewed from the laser housing 40 by the user. The threaded engagement of the clamping screw 58 with the housing 40 whereby the clamping screw 58 is driven against the rear portion 32 of the head 18 by tightening the knob 68, as mentioned above, provides a substantial clamping force which ensures sustained perpendicularity of the laser aiming beam 54 to the face 26 during putting practice. Those skilled in the art of metal fabrication are familiar with manufacturing equipment such as, but not limited to, automatic screw machines which can be used to produce the clamping screw 58.

Formed in the laser housing 40 adjacent the alignment surface 50 is a transversely extending slot 74 adapted to receive the generally vertical portion of the putter head 18 bounded by the front face 26 and the rear side 30. Most standard putters have the transversely extending rear portion 32 behind the front face 26 and parallel thereto such that the laser housing 40 can be positioned on the head 18 and clamped above the point on the front face 26 where the user prefers to impact the ball 28.

Referring again to FIG. 2, the laser module 52 utilized in this embodiment is well known in the industry and may be purchased as an assembly having a first conductive means, preferably a cylindrical housing 86, and having a second conductive means, preferably a spring member 88. The conductive means 86 and 88 are used to couple first and second opposite polarity electrical potentials from the voltage source 95 to energize the laser module 52. Preferably, the cylindrical housing 86 is a positive terminal and the spring member 88 is a negative terminal. The laser module utilized in the present invention is available from any one of a number of vendors such as Lyte Optronics, Santa Monica, Calif. As shown in FIG. 2, the cylindrical housing 86 slidably fits into an insulating sleeve 90 located in the bore 44. The insulating sleeve 90 may be molded from any one of a number of well known plastic molding materials. The laser module 52 projects its laser beam 54 through the opening 56 in the front surface 42 of the laser housing 40. The insulating sleeve 90 electrically isolates the laser module 52 from the metalic laser housing 40.

Also positioned in the insulating sleeve 90 is a thin wall insulative sleeve 100 in which there is located the voltage source 95 comprised of a series connection of disc shaped batteries 96. Duracell Corp. is a well known source for the 1.5 volt micro alkaline cells, similar to those used in cameras, which are employed in the present invention. The batteries 96 fit snugly in the sleeve 100 which contacts each positive electrode 108 of the batteries 96. Electrically insulated from the positive electrodes 108, a negative termination 110 of the series connection contacts the spring member 88 as shown in FIG. 2. A cylindrical insulating washer 91 fits into the insulating sleeve 90 and is adapted to support the spring member 88. An electrically conductive metalic cap 102 threadedly engages a rear portion 104 of the housing 40 and contacts the positive electrode 108 of the battery 96 adjacent the cap 102 thereby maintaining, in biased contact, the positive termination of the voltage source 95 with the conductive cap 102 and thus, the conductive housing 40.

Figure 3:
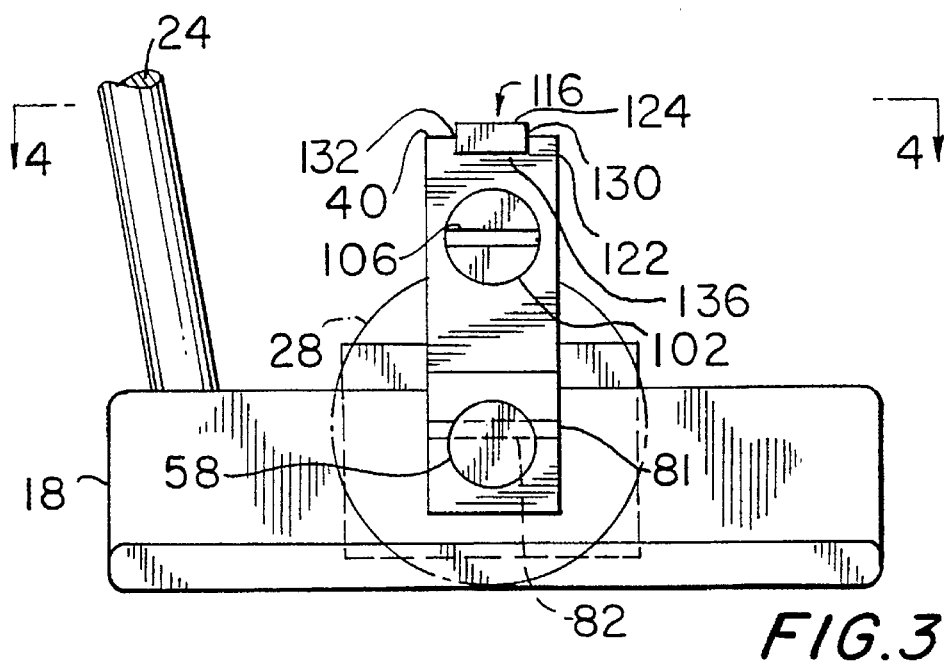
FIG. 3 is a rear view of the putter head illustrated in FIG. 1 showing the first embodiment of the laser aiming device removably affixed to the head of the putter.
Figure 4:
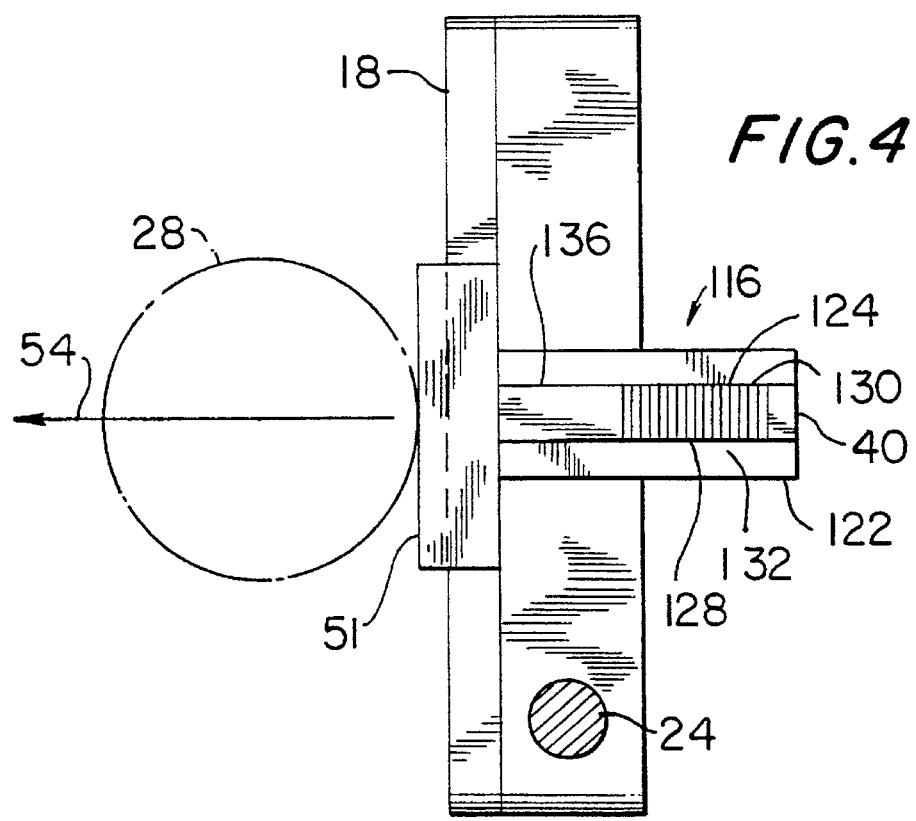
FIG. 4 is a fragmentary sectional view of the putter head shown in FIG. 3 taken along the lines 4—4.

Referring to FIGS. 2, 3 and 4, there is shown a slide switch generally referred to by reference number 116. It is located in the upper portion 122 of the laser housing 40 and is normally activated by the user's thumb to turn on and turn off the laser aiming beam 54 during putting practice. The switch 116 is comprised of a slide element 124, preferably fabricated from any one of a number of well known plastic resins, and a switch contact 126, manufactured using an electrically conductive resilient material such as, but not limited to, spring tempered stainless steel.

The slide element 124 has a serated top surface 128 and first 130 and second 132 laterally extending parallel sides which fit slidably into a guideway 136 formed in the upper portion 122 of the laser housing 40. Also formed in the upper portion 122 is a guide slot 142 in which a lower section 125 of the slide element 124 is guided. Affixed to the slide element 124 by any one of a number of fastening techniques such as rivets 144 and 146 is the switch contact 126 which makes a slidable electrical connection with the upper portion 122 along an interface 127 between the housing 40 and the switch contact 126. As shown in FIG. 2, the switch contact 126 operates in an opening 92 formed in the insulating sleeve 90. When the slide element 124 is urged forward from its off position as shown in FIG. 2 to turn on the laser module 52, the switch contact 126 rides down a ramp section 148 formed in the insulating sleeve 90 and the switch contact 126 moves into biased contact with the cylindrical housing 86 thereby completing a series circuit between the batteries 96 and the laser module 52 so as to turn on the laser aiming beam 54. The aiming beam 54 is turned off by moving the slide switch 116 back to the off position wherein the switch contact 126 is electrically insulated from the cylindrical housing 86 by the ramp section 148.

FIG. 3 is a rear view of the laser housing 40. A slot 106 formed in the cap 102 is used by the player to tighten or remove the cap 102 by employing a screwdriver or a coin to engage the slot 106 when replacing or removing the batteries 96. As mentioned above, the retaining pin 82 is pressed into the transverse bore 81 to retain the clamping screw 58 in the laser housing 40.

Turning now to FIGS. 5 through 8 in the drawings there is illustrated an alternate embodiment of the invention offering certain variations over the first embodiment. Principally, the laser housing in the alternate embodiment includes two tabs which align the laser aiming device on the head of the club rather than the one tab as in the first embodiment. In this mounting arrangement, the laser aiming beam is positioned above the preferred impact point on the face of the club such that the ball may be impacted by the striking face of the putter.

Figure 5:
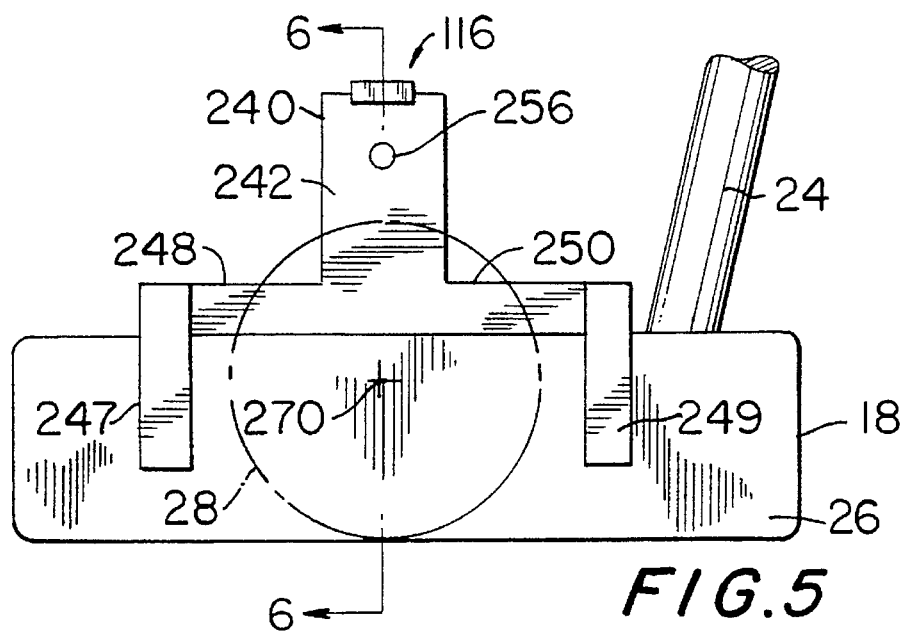
FIG. 5 is a front view of the golf club putter head including a second embodiment of the laser aiming device of the present invention removably affixed to the head of the putter.
Figure 6:
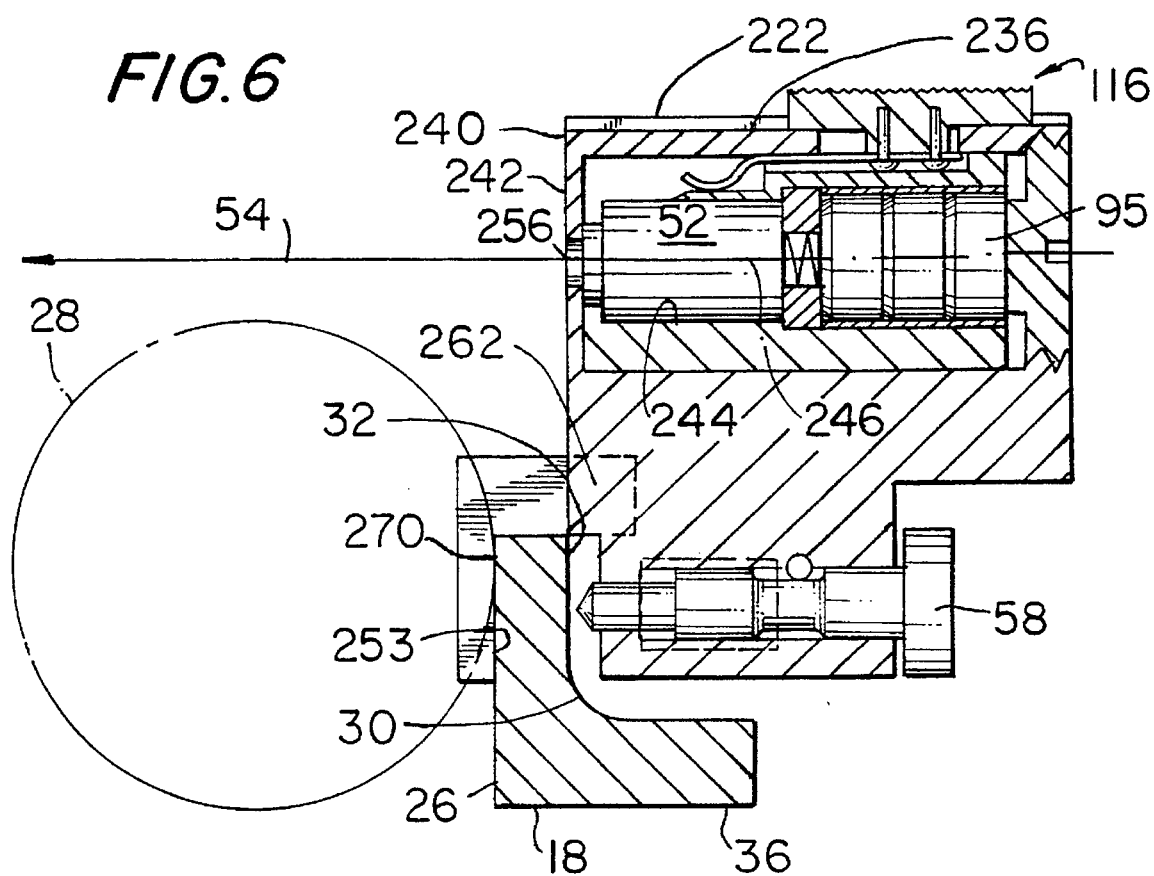
FIG. 6 is an enlarged sectional view of the laser aiming device shown in FIG. 5 taken along the lines 6—6.
Figure 7:
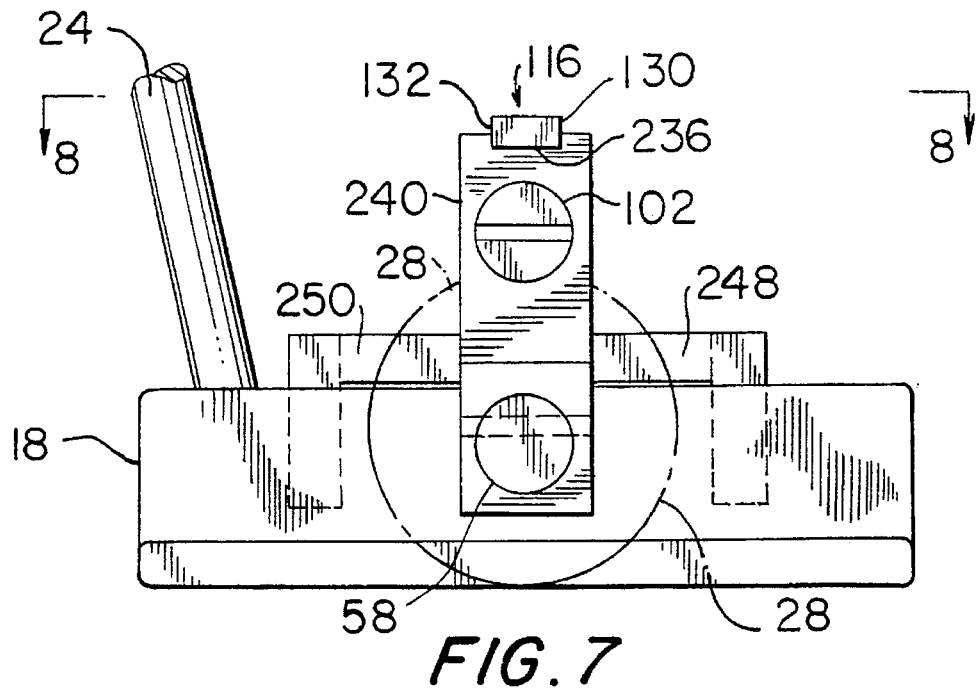
FIG. 7 is a rear view of the putter head illustrated in FIG. 5 showing the second embodiment of the laser aiming device removably affixed to the head of the putter.
Figure 8:
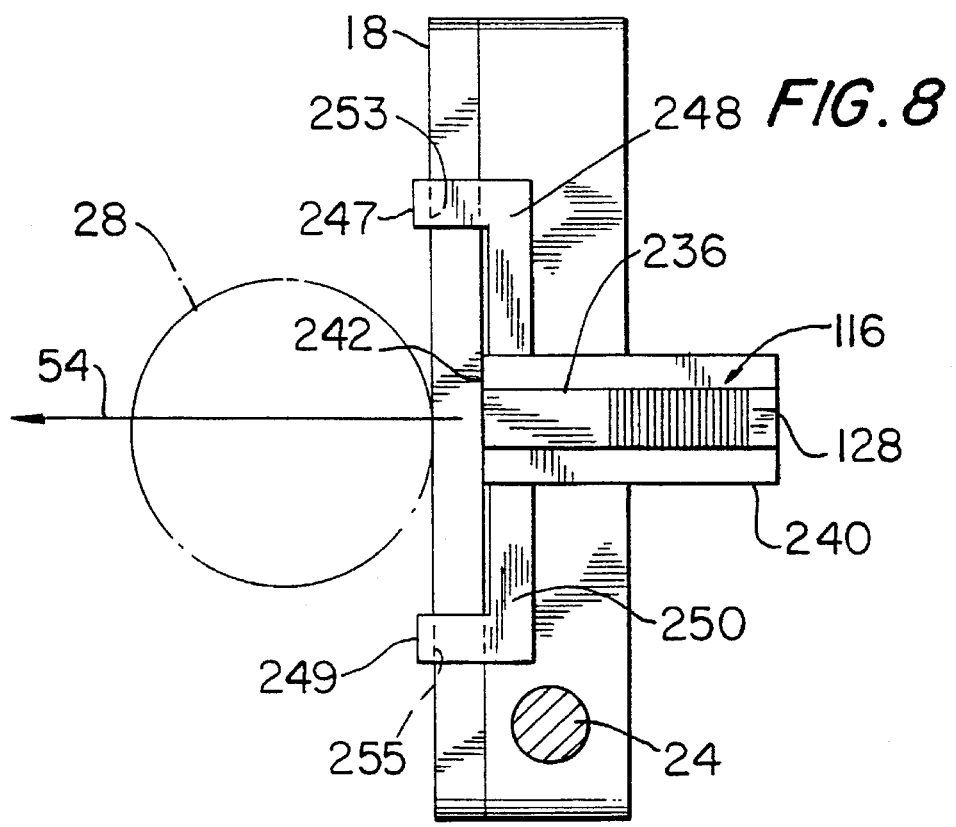
FIG. 8 is a fragmentary sectional view of the putter head shown in FIG. 7 taken along the lines 8—8.

In FIG. 5 there is shown the lower portion of the putter having the laser aiming apparatus of the second embodiment mounted thereon. As described in the first embodiment, the lower portion of the putter 14 includes the lower end 24 of the shaft 16 with the head 18 attached thereto. The head 18 has a transversely extending generally planar front face 26 and a rear side 30 which has a generally planar rear portion 32 formed substantially parallel to the front face 26 and spaced apart therefrom. A generally flat weighted heel portion 36 is formed as part of the head 18 normal to the generally vertical front face 26. Shown in phantom adjacent the front face 26 is a golf ball 28 in position to be putted.

FIGS. 5 through 8 illustrate a laser housing 240 preferably fabricated by similar methods as those used to manufacture the laser housing 40 of the first embodiment. Removably affixed to the head 18, the laser housing 240 defines an upper portion 222 and a lower portion 262. Included as part of the upper portion 222 is a generally planar front surface 242 and a bore 244 formed therein. In the lower portion 262 there are two tabs, a left tab 247 and a right tab 249 located below and adjacent the front surface 242. Formed as part of the lower portion 262, a left arm 248 and a right arm 250 position the tabs 247 and 249 so as to engage the head 18 at points on the front face 26 to the left and right of a point 270 at which the front face 26 impacts the golf ball 28. The tabs 247 and 249 provide coplanar alignment surfaces 253 and 255, respectively. The common plane of the surfaces 253 and 255 is perpendicular to the axis 246 of the bore 244 so that when the surfaces 253 and 255 are brought into biased contact with the front face 26, the axis 246 is aligned substantially perpendicular to the front face 26. Mounted in the bore 244 is the laser module 52 which emits the laser aiming beam 54 coincident with the axis 246 of the bore 244. The beam 54 is emitted through an opening 256 formed in the front surface 242.

In the second embodiment, the mounting arrangement of the laser module 52, the voltage source 95 and the switch 116 in the laser housing 240 is substantially the same as the mounting arrangement of these components in the laser housing 40 as previously described in detail for the first embodiment. Also, the cooperation of the switch 116 and the guideway 236 in the second embodiment is the same as for the switch 116 and guideway 136 of the first embodiment. Further, in the second embodiment, the cooperation of the clamping screw 58 with the laser housing 240 and the rear portion 32 is substantially the same as the cooperation of the clamping screw 58, the laser housing 40 and the rear portion 32 as described above for the first embodiment. To avoid needless repetition, elements employed in the second embodiment which are substantially the same as elements used in the first embodiment and which are described as part of the disclosure of the first embodiment are not described again as part of the disclosure of the second embodiment.

It is also to be understood that the present invention is not limited to the precise details of structure shown and set forth in the specifications describing the embodiments described herein for obvious modifications will occur to those skilled in the art to which the invention pertains.

What is claimed is:

1. A laser aiming apparatus for use by a golfer to practice putting, said apparatus comprising:

a putter including a shaft having a putter head affixed at a first end of said shaft and a grip affixed at a second end of said shaft;

said head having a transversely extending generally planar front face for striking a golf ball and a generally planar rear portion formed substantially parallel to said front face and spaced apart therefrom;

a laser housing having an upper and a lower portion;

said lower portion defining at least one mounting tab including a generally planar alignment surface adapted to engage said front face of said putter head;

said upper portion including a bore formed therein such that the axis of said bore is perpendicular to said alignment surface;

a laser module mounted in said bore adapted to project a laser beam through an opening in said bore such that said laser beam is coincident with the axis of said bore;

at least one clamping means affixed to said laser housing; and said clamping means being positioned into biased contact with said rear portion of said head for removably affixing said laser housing to said head such that said head is clamped between said alignment surface and said clamping means so that said laser beam is emitted substantially perpendicular to said front face of said head.

2. A laser aiming apparatus in accordance with claim 1 wherein said laser housing is clamped to said head such that said laser aiming beam is emitted above a point on said front face where said ball is positioned to be putted so that said beam is emitted above said golf ball to be putted.

3. A laser aiming apparatus in accordance with claim 1 wherein said clamping means is threadedly engaged in said laser housing.

4. A laser aiming apparatus in accordance with claim 1 wherein said mounting tab has a generally planar front face for impacting said golf ball during putting practice.

5. A laser aiming apparatus in accordance with claim 1 wherein said bore has a voltage source mounted therein.

6. A laser aiming apparatus in accordance with claim 1 wherein said laser housing has an on-off switch located on a top portion thereof.

7. A golf club putter with a laser aiming device comprising:

an electrically conductive laser housing affixed to the head of said putter, said putter head having a face on a front side thereof for striking a golf ball;

said laser housing having a bore including an opening through a front side thereof;

a laser module mounted in said bore adapted to project a laser beam through said opening in said front side such that said laser beam is coincident with the axis of said bore;

a voltage source and a conductive switch element for controlling said voltage source communicating in said bore;

said laser module having first and second conductive means coupling opposite polarity potentials, a first pole and a second pole, from said voltage source to said laser module to cause said laser module to emit said laser beam;

said second pole and said second conductive means being insulated from said conductive housing wherein said second pole and said second conductive means are electrically connected;

said conductive switch element being in sliding biased contact with said conductive housing and, in an off position, being insulated from said first conductive means; and said first pole of said voltage source being electrically connected to said conductive housing such that when said switch element is placed in an on position, said switch element electrically connects said first conductive means to said first pole through said conductive housing.

8. A laser aiming apparatus for use by a golfer to practice putting, said apparatus comprising:

a putter including a shaft having a putter head affixed at a first end of said shaft and a grip affixed at a second end of said shaft;

said head having a transversely extending generally planar front face for striking a golf ball and a generally planar rear portion formed substantially parallel to said front face and spaced apart therefrom;

a laser housing having an upper and a lower portion;

said lower portion defining left and right mounting tabs including coplanar alignment surfaces adapted to engage said front face of said putter head to the left and to the right, respectively, of a select point on said front face where said front face impacts said ball;

said upper portion including a bore formed therein such that the axis of said bore is perpendicular to said coplanar surfaces of said mounting tabs;

a laser module mounted in said bore adapted to project a laser beam through an opening in said bore such that said laser beam is coincident with the axis of said bore;

at least one clamping means affixed to said laser housing; and said clamping means being positioned into biased contact with said rear portion of said head for removably affixing said laser housing to said head such that said head is clamped between said alignment surfaces and said clamping means so that said laser beam is emitted substantially perpendicular to said front face of said head.

9. A laser aiming apparatus in accordance with claim 8 wherein said laser housing is clamped to said head such that said laser aiming beam is emitted above a point on said front face where said ball is positioned to be putted so that said beam is emitted above said golf ball to be putted.

10. A laser aiming apparatus in accordance with claim 8 wherein said clamping means is threadedly engaged in said laser housing.

11. A laser aiming apparatus in accordance with claim 8 wherein said bore has a voltage source mounted therein.

12. A laser aiming apparatus in accordance with claim 8 wherein said laser housing has an on-off switch located on a top portion thereof.

* * * * *